United States Patent [19]
Ludewig

[11] Patent Number: 5,577,269
[45] Date of Patent: Nov. 19, 1996

[54] ANTENNA CONNECTOR FOR A PORTABLE RADIO

[75] Inventor: Christopher J. Ludewig, Northfield, Minn.

[73] Assignee: E. F. Johnson Company, Burnsville, Minn.

[21] Appl. No.: 426,097

[22] Filed: Apr. 21, 1995

[51] Int. Cl.⁶ ......................................... H04B 1/38
[52] U.S. Cl. ................................... 455/90; 455/89
[58] Field of Search ......................... 455/77, 89, 90, 455/289, 347, 97, 129, 348; 343/702, 901; 379/433

[56] References Cited

U.S. PATENT DOCUMENTS

| | | | |
|---|---|---|---|
| 3,946,390 | 3/1976 | Alexander et al. | 343/702 |
| 4,431,255 | 2/1984 | Banning | 439/578 |
| 4,525,718 | 6/1985 | Imazeki et al. | 343/702 |
| 4,611,213 | 9/1986 | Johnson et al. | 343/702 |
| 4,690,471 | 9/1987 | Marabotto et al. | 439/246 |
| 4,760,401 | 7/1988 | Imazeki | 343/702 |
| 4,802,235 | 1/1989 | Treatch | 455/77 |
| 4,842,527 | 6/1989 | Tellam | 439/581 |
| 4,867,698 | 9/1989 | Griffiths | 343/702 |
| 4,868,576 | 9/1989 | Johnson, Jr. | 343/702 |
| 4,890,114 | 12/1989 | Egashira | 343/702 |
| 5,015,194 | 5/1991 | Seas | 439/314 |
| 5,079,562 | 1/1992 | Yarsunas et al. | 343/792 |
| 5,133,676 | 7/1992 | Hutchison et al. | 439/581 |
| 5,145,382 | 9/1992 | Dickirson | 439/581 |
| 5,157,410 | 10/1992 | Konishi | 343/715 |
| 5,201,072 | 4/1993 | Kobayashi | 455/289 |
| 5,204,687 | 4/1993 | Elliott et al. | 343/702 |
| 5,211,581 | 5/1993 | Schwartz et al. | 439/581 |
| 5,232,377 | 8/1993 | Leibfried, Jr. | 439/578 |
| 5,278,570 | 1/1994 | Jaramillo et al. | 343/702 |
| 5,302,963 | 4/1994 | Wiggenhorn | 343/702 |
| 5,317,325 | 5/1994 | Bottomley | 343/702 |
| 5,321,738 | 6/1994 | Ha | 343/702 |
| 5,335,368 | 8/1994 | Tamura | 455/90 |
| 5,371,898 | 12/1994 | Grube et al. | 455/89 |

*Primary Examiner*—Reinhard J. Eisenzopf
*Assistant Examiner*—Marsha D. Banks-Harold
*Attorney, Agent, or Firm*—Schwegman, Lundberg, Woessner & Kluth, P.A.

[57] ABSTRACT

A portable radiotelephone includes a chassis and antenna connector with an impedance of less than 200 ohms, the antenna connector supporting an extendable antenna that is movable back and forth between extended and retracted positions relative to the chassis. The antenna connector also can support a fixed antenna or a connection to external equipment. A universal radiotelephone housing includes a single external connector port for selectively providing electrical connection to both an extendable antenna and external test equipment, precluding the need for separate test and extendable antenna ports. The single external connector port includes an aperture allowing the extendable antenna to pass therethrough.

20 Claims, 7 Drawing Sheets

ANTENNA CONNECTOR FOR A PORTABLE RADIO

BACKGROUND OF THE INVENTION

1. Field of the Invention

The invention relates to portable radiotelephones, and more particularly, to portable radiotelephones having an antenna that is extendable and/or selectively connectable to external test equipment.

2. Description of Related Art

Mobile dispatch radio systems provide two-way radio communication between a central control station and a fleet of cars, trucks, or other vehicles. Typical users of dispatch systems include, for example, police departments, fire departments, taxi services and delivery services. Present dispatch systems can be configured to provide radio communication between the control station and all vehicles in a fleet, between the control station and selected vehicles in the fleet, or between different individual vehicles or groups of vehicles within a fleet. Transmission trunked systems group a number of channels together for a particular coverage zone, enabling two or more users to communicate at the same time. Each channel is comprised of a pair of assigned frequencies, a mobile transmit frequency and a repeater transmit frequency, with the repeater transmit frequencies typically being either 39 MHz or 45 MHz above a corresponding mobile transmit frequency. Dispatch systems are typically simplex systems; the control station and the mobile units, for example, cannot transmit on the same channel simultaneously.

Dispatch radios have a transmission power sufficient to reach a repeater associated with the control station from anywhere within a particular coverage zone that is relatively large, on the order of 100 square miles. Typical dispatch radios have higher transmission powers than cellular portable radios, for example, and typically use a substantial metallic plate as part of the radio housing in order to maximise transmit power while grounding the radio and reducing transmission background noise to an acceptable level. A substantial metallic plate also provides better heat sink and ruggedness. Additionally, dispatch radios typically use fixed antennas, as opposed to extendable antennas. Users of dispatch systems typically believe that fixed antennas are necessary to provide the transmission characteristics required in dispatch environments, and that extendable antennas are not sufficiently rugged and durable in such environments. Typical fixed antennas have an impedance of 50 ohms and are connected to the dispatch radio by a 50 ohm antenna connector.

Unlike dispatch systems, typical cellular radiotelephone systems are duplex systems that allow simultaneous transmission by two mobile transceivers on a particular channel, comprised of a receive/transmit pair of frequencies, for point-to-point communication. Coverage zones in cellular systems are relatively small compared to dispatch coverage zones, on the order of five square miles, and a network of small coverage zones blankets the area served by the cellular system.

Because cellular coverage zones are relatively small, cellular radios require less transmission power than dispatch radios; typical cellular transmission power is three watts or less, and often less than one watt. Typical cellular radios do not use the substantial metallic plate present in typical dispatch radios. Typical cellular radio housings are often formed entirely of plastic, and contain small amounts of metal, in a PC board, for example, for heat sink purposes. Users of cellular systems generally have preferred extendable antennas because they provide greater compactness, easier storage and a more desirable appearance. Additionally, because extendable antennas can be withdrawn into the radio, extendable antennas are less likely to be broken off or otherwise damaged during periods of non-use. Typical extendable antennas have an impedance of 600 ohms and are connected to cellular radios by a 600 ohm antenna connector.

Attempts to use extendable antennas in radios with substantial mettalic plates, such as typical dispatch radios, have been unsuccessful. As described above, dispatch radios typically use 50 ohm antenna connectors, and extendable antennas have an impedance of 600 ohms. Using a 600 ohm antenna connection point in radios with a substantial metallic plate generates significant stray capacitance at the connection point between the antenna and the metallic plate of the radio, preventing the radio from functioning properly. Additionally, the large amount of metal in the plate tends to detune an extendable antenna. Although typical cellular radios have plastic housings and thus avoid the problems associated with metallic plates, radios with high power requirements typically use metallic plates as part of the housing and thus typically do not use extendable antennas.

With both cellular and dispatch radios, it is often desirable to use external test equipment, such as signal generators, power meters, deviation monitors, frequency counters, etc., to determine whether the radios are functioning properly. Typical test equipment has an impedance of 50 ohms and thus requires a 50 ohm connection point to the radio. To facilitate such connection, many cellular radios using 600 ohm antenna connectors for 600 ohm extendable antennas include a 50 ohm test port in the housing for the radio, separate from the 600 ohm extendable antenna connector, for receiving a coaxial cable that connects to the test equipment. A switch mechanism typically is provided within such radios, for alternately connecting either the antenna connector or the test port to the radio circuit. Mechanical wear and other problems, however, render such switch mechanisms subject to failure. Additionally, the expense and complexity of such mechanisms are quite disadvantageous.

The above reasons have generally precluded the design of a single portable radio housing that would service either a dispatch radio or a cellular radiotelephone. Accordingly, it would be desirable to provide a universal portable radio housing having antenna and test connector ports and capable of supporting both dispatch and cellular radios. It also would be advantageous to provide a dispatch radio having an antenna connector accommodating a 600 ohm extendable antenna, to achieve the advantages of extendable antennas in a dispatch environment. It also would be advantageous to eliminate the extra test ports typically found on cellular radios, to avoid the problems associated with such test ports.

SUMMARY OF THE INVENTION

To overcome the above and other disadvantages, a dispatch radio according to an embodiment of the invention provides radio communication to a central control station. The dispatch radio includes a metallic chassis that forms a ground plane of the dispatch radio, an antenna connector supported by the chassis, the antenna connector having an impedance of less than 200 ohms, an extendable antenna supported by the antenna connector and movable back and forth between extended and retracted positions, and a matching circuit substantially matching the impedance of the extendable antenna with the impedance of the antenna connector.

According to another aspect of the invention, a radiotelephone embodiment includes a chassis and single external connector port means for selectively providing electrical connection to an extendable antenna and to external test equipment so as to preclude the need for separate test and extendable antenna ports. The single external connector port means includes an aperture to allow an extendable antenna to pass therethrough. The radiotelephone further includes means for connecting the single external connector port means to an extendable antenna that is movable back and forth between extended and retracted positions. The means for connecting includes matching circuit means for substantially matching the impedance of the single external connector port means with the impedance of the extendable antenna. The radiotelephone also includes means for connecting the single external connector port means to radiotelephone test equipment.

According to another aspect of the invention, a radiotelephone embodiment includes a chassis and an antenna connector supported by the chassis and receiving an extendable antenna that is movable between extended and retracted positions. The antenna connector alternately receives a fixed antenna, fixed in a position external to the chassis. The radiotelephone further includes a matching circuit coupled with the extendable antenna to substantially match the impedance of the antenna connector with the impedance of the extendable antenna.

According to yet another aspect of the invention, a method of using a radiotelephone to preclude the need for separate test and extendable antenna ports includes supporting a single external connector port by a chassis of the radiotelephone, selectively connecting an extendable antenna to the single external connector port and extending the extendable antenna through an aperture in the single external connector port, selectively disconnecting the extendable antenna from the single external connector port, and selectively connecting external test equipment to the single external connector port.

BRIEF DESCRIPTION OF THE DRAWINGS

Embodiments of the invention will be described with reference to the figures, in which like reference numerals denote like elements and in which.

DETAILED DESCRIPTION OF PREFERRED EMBODIMENTS

Figures 1, 2:
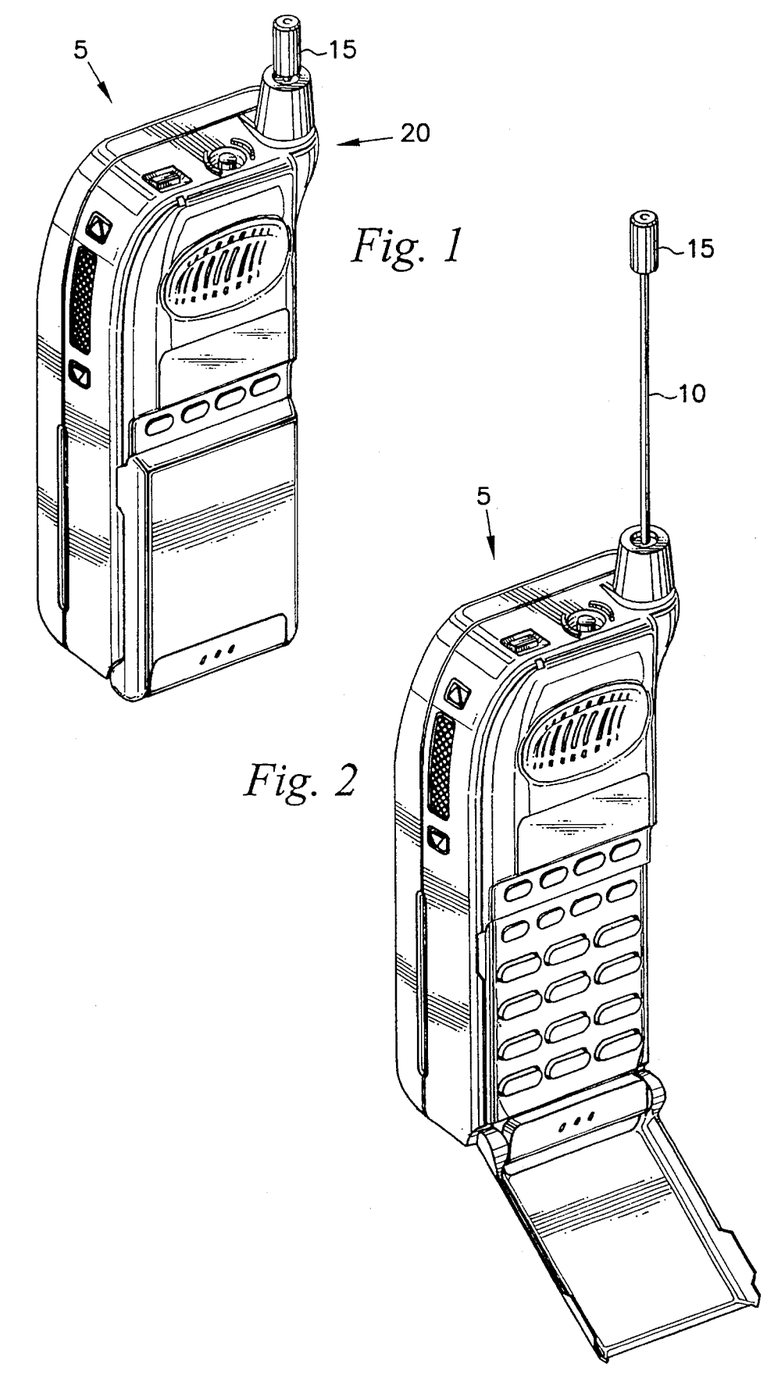
FIG. 1 is a perspective view of a portable radiotelephone according to an embodiment of the invention.
FIG. 2 is a perspective view of the FIG. 1 radiotelephone, showing alternative positions for an extendable antenna and a keypad cover.

FIGS. 1-2 illustrate an electronic communication device according to the invention, such as a dispatch radio having a substantial metallic grounding plate to support relatively high transmission powers. Radio 5 includes an extendable or collapsible antenna, including mast 10 with coil 15 at its uppermost end. Mast 10 is connected to the remainder of radio 5 by antenna connection assembly 20, to be described with reference to the remaining figures.

Figure 3:
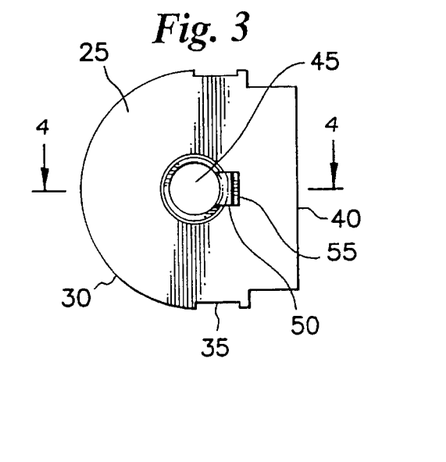
FIG. 3 is a bottom view of an antenna connector according to an embodiment of the invention.
Figure 4:
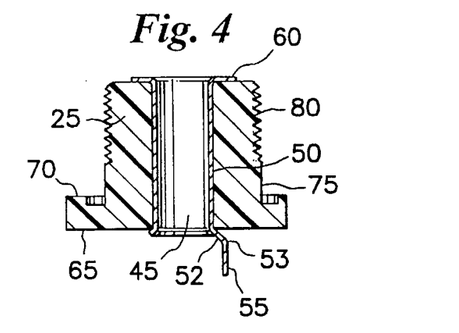
FIG. 4 is a cross-sectional view taken along line 4—4 of FIG. 3.

Antenna connection assembly 20 includes antenna connector 25, which preferably is formed of plastic, polyester or a similar insulative material. Assembly 20 preferably includes arc-shaped edge portion 30, twin slots 35, and rectangular edge portion 40, as shown in FIG. 3. As shown in FIG. 4, base 65 of antenna connector 25 supports upstanding cylindrical portion 75, which includes threads 80 for connection to an antenna and/or an adapter, as will be described later. Antenna connector 25 also includes circular ledge 70 that surrounds upstanding portion 75 and that supports a grounding clip, to be described below with reference to FIGS. 6 and 9.

Antenna connector 25 includes central aperture 45, within which extendable antenna mast 10 extends and retracts relative to the housing of radio 5. Hollow center tube 50 extends through antenna connector 25 along aperture 45, and acts as an RF conductor. At its upper end, center tube 50 flares outwardly at 60 to connect to a mating adapter or to a matching circuit of extendable antenna 10. At its lower end, center tube 50 includes projecting tab 55, which includes angled portion 52 and connecting portion 53, for connection to internal circuitry of radio 5. Tab 55, for example, can be soldered to internal printed circuit board 107, as shown in FIG. 6.

Figure 5:
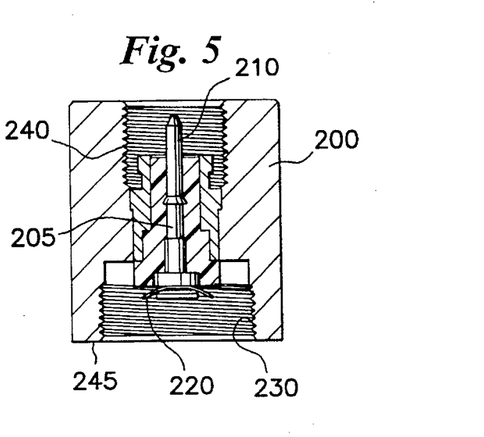
FIG. 5 is a cross-sectional view of a male SMA adapter.

FIG. 5 illustrates one type of adapter that is connectable to antenna connector 25, in place of an extendable antenna. Male Subminiature type A (SMA) adapter 200 includes center conductor 205, having connection portion 210 at its upper end for connection to a cable conductor, for example.

Center conductor 210 preferably includes curved spring contact 220 at its lower end, for conductive connection to flared portion 60 of conductive hollow center tube 50 of antenna connector 25. Adapter 200 also preferably includes upper threads 240, for securing an external device in electrical communication with connection portion 210 of conductor 205. Adapter 200 also includes lower threads 230, for securing antenna connector 25 in electrical communication with spring contact 220.

Figure 6:
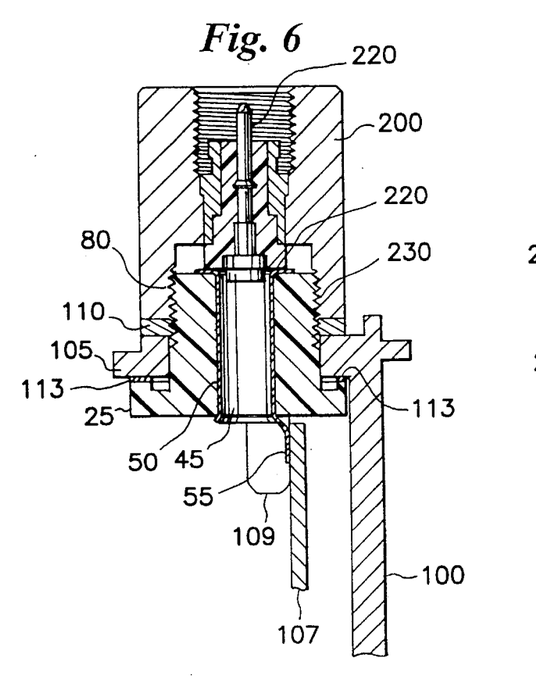
FIG. 6 is a cross-sectional view of an SMA adapter and antenna connector mounted on a chassis according to an embodiment of the invention.
Figure 17:
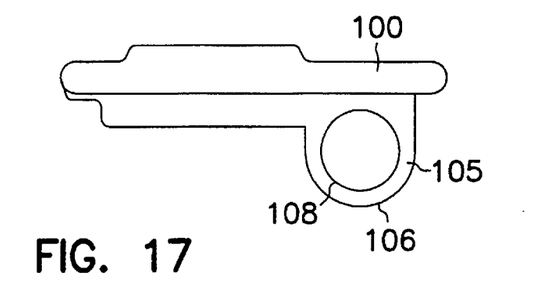
FIG. 17 is a plan view of a chassis according to an embodiment of the invention.

FIG. 6 shows antenna connector 25 secured on metallic chassis 100 of radio 5, and male adapter 200 secured to antenna connector 25. Metallic chassis 100, which serves as a ground plane of radio 5, includes perpendicular support flange 105. Support flange 105 preferably extends toward the front of radio 5 shown in FIGS. 1–2, but of course embodiments of the invention also contemplate orienting flange 105 in other directions. Curved edge 106 of flange 105, best shown in FIG. 17, preferably is similar in shape to antenna connector 25, as viewed in FIG. 3. Chassis 100 also includes flange 111, which provides additional structural support for flange 105, and flange 112, which serves as a mating flange for the remainder of the radio housing. Additionally, flanges 111, 112 guide and maintain antenna connector 25 in a proper position on chassis 100 during assembly of the radio.

Upstanding cylindrical portion 75 of antenna connector 25 extends through central aperture 108 of flange 105 and preferably is fastened in place by metallic threaded spanner nut 110, which is screwed onto threads 80 of antenna connector 25. Male SMA adapter 200 also is screwed onto threads 80, until lower edge 245 of adapter 200 is in secure electrical grounding contact with chassis 100 through spanner nut 110. At that point, spring contact 220 is flattened, relative to its curved orientation in FIG. 5, to provide electrical communication with hollow center tube 50 of antenna connector 25.

As described earlier, projecting tab 55 of hollow center tube 50 is in electrical communication with internal circuitry of radio 5. As shown in FIG. 6, for example, tab 55 is fixedly connected, as by soldering or the like, to printed circuit board 107. Additionally, clip 113, preferably formed of sheet metal or a similar conductive material, is disposed around the top of base 65, outside upstanding portion 75 and adjacent flange 105. Clip 113 includes twin depending tabs 109, one of which is shown in FIG. 6, which provide electrical ground contact between printed circuit board 107 and chassis 100.

Figures 7, 8, 9:
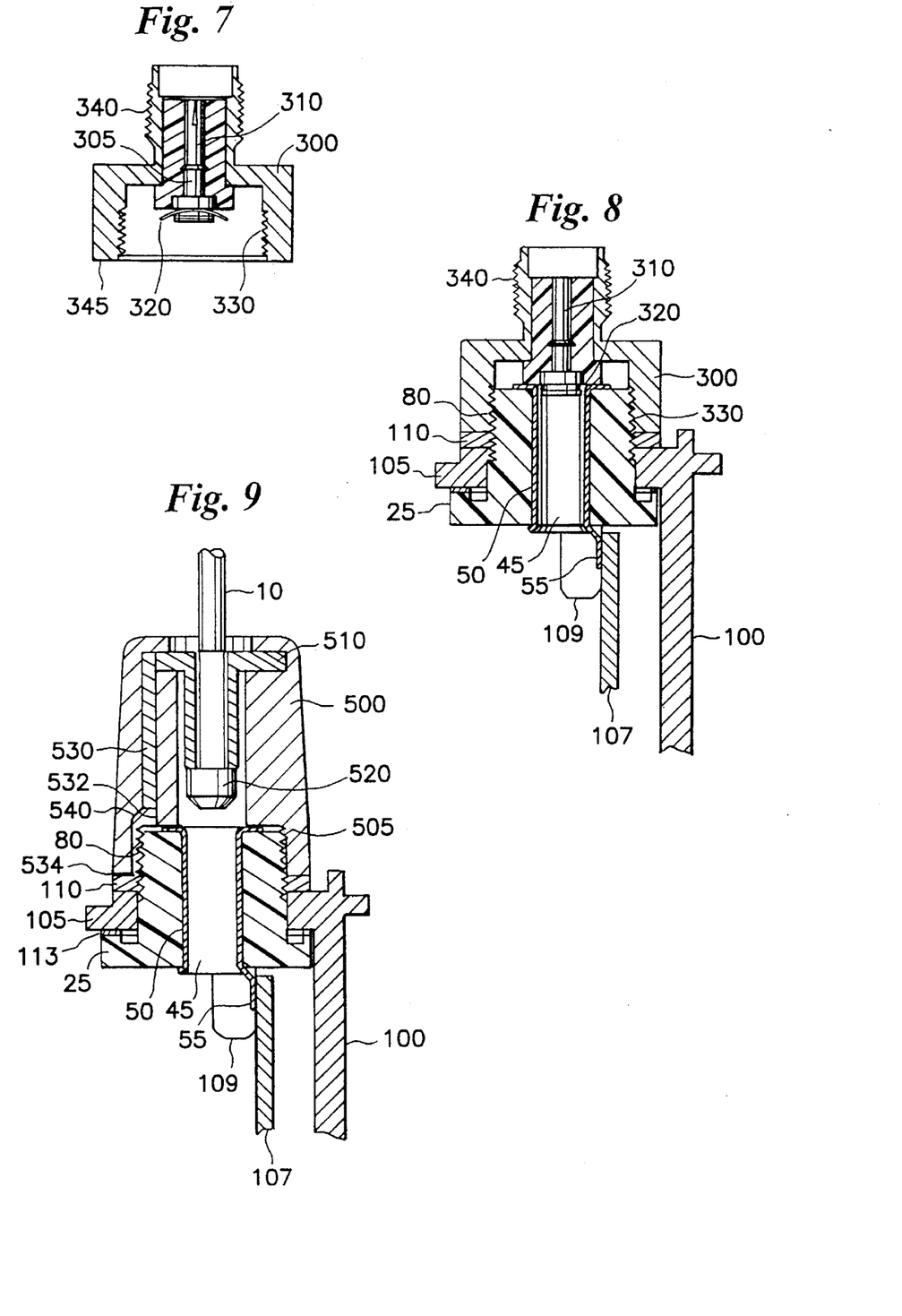
FIG. 7 is a cross-sectional view of a female SMA adapter.
FIG. 8 is a cross-sectional view of a female SMA adapter and an antenna connector supported by a chassis according to an embodiment of the invention.
FIG. 9 is a cross-sectional view of an antenna connector, matching circuit and extendable antenna supported by a chassis according to an embodiment of the invention.

FIGS. 7–8 illustrate a female SMA adapter and its connection to antenna connector 25. Female SMA adapter 300 includes center conductor 305, having connection portion 310 at its upper end. Center conductor 310 preferably includes curved spring contact 320 at its lower end, for conductive connection to flared portion 60 of conductive hollow center tube 50 of antenna connector 25. Adapter 300 also preferably includes upper threads 340, for securing an external device in electrical communication with connection portion 310 of conductor 305, and lower threads 330, for securing antenna connector 25 in electrical communication with spring contact 320.

As shown in FIG. 8, female SMA adapter 300 is screwed onto threads 80 above spanner nut 110, until lower edge 345 of adapter 300 is in secure electrical grounding contact with chassis 100 through spanner nut 110. At that point, spring contact 320 is straightened, relative to its curved orientation in FIG. 7, to provide electrical communication with hollow center tube 50 of antenna connector 25.

According to a preferred embodiment, antenna connector 25 and adapters 200, 300 provide a nominal RF impedance of approximately 50 ohms. This allows antenna connector 25 to be directly connected to external equipment, such as a signal generator, power meter, deviation monitor, or frequency counter, for example, without requiring impedance matching. A 50 ohm connection point also eliminates the problem of stray capacitance, and allows fixed, non-collapsible antennas to be attached to radio 5 without impedance matching.

As described earlier, embodiments of the invention overcome a significant disadvantage of the prior art, in that antenna connection assembly 20 and antenna connector 25 can be used to easily connect extendable antennas, and fixed antennas, to radios having a substantial metallic plate that functions as a ground plane to support high transmission powers, as well as to other radios. Connection of extendable antennas to radio 5, as well as alternative embodiments of antenna connector 25, now will be described.

As shown in FIG. 9, an extendable antenna assembly according to the invention includes tapered housing 500, preferably formed of plastic. Housing 500 preferably includes threaded internal surface 505 for attachment to external threads 80 of antenna connector 25. Antenna sleeve 510 is fixed within housing 500 to surround the end of antenna mast 10 and to prevent passage of hexagonal stop 520, thereby preventing removal of antenna mast 10 from housing 500. Antenna sleeve 510 also electrically connects antenna mast 10 to matching printed circuit board 530, which matches the impedance of antenna connector 25, preferably approximately 50 ohms, to the impedance of extendable antenna 10, typically 600 ohms. Details of the matching circuit of PCB 530 will be described with reference to FIGS. 14–15, below.

Printed circuit board 530 is electrically connected to hollow center conductor 50 of antenna connector 25 by spring contact 532, which is soldered to PCB 530 and extends over to hollow center conductor 50. PCB 530 also is grounded to chassis 100, via spanner nut 110, by ground line 540. Ground line 540 preferably is a spring clip soldered onto the other side of PCB 530 and mating with ground ring 534 for grounding connection to spanner nut 110.

Figure 10:
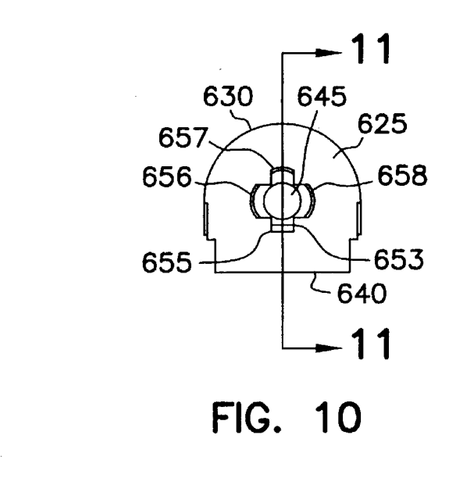
FIG. 10 is a bottom view of an antenna connector according to an embodiment of the invention.
Figure 11:
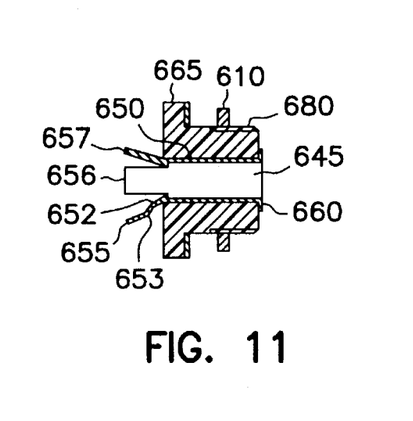
FIG. 11 is a cross-sectional view along line 11—11 of FIG. 10.
Figure 12:
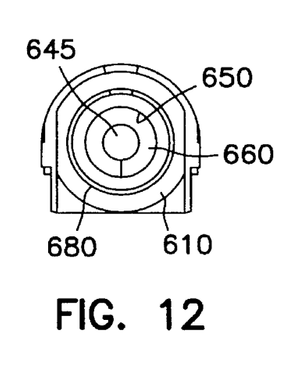
FIG. 12 is a top view of the FIG. 10 antenna connector.

FIGS. 10–12 show another antenna connector embodiment according to the invention. Antenna connector 625 preferably is formed of plastic, polyester or similar insulative material and includes arc-shaped edge portion 630, preferably corresponding to edge 106 of flange 105, as described previously. Antenna connector 625 also includes rectangular edge portion 640. Base 665 supports upstanding cylindrical portion 675, which includes threads 680 for connection to an antenna, such as extendable antenna 10. Alternatively, threads 680 also allow connection to an adapter, such as previously described male/female SMA adapters 200, 300, for communication with external equipment.

Antenna connector 625 also includes central aperture 645, within which extendable antenna mast 10 extends and retracts relative to the remainder of radio 5, as will be described. Hollow center tube 650 extends through antenna connector 625 along aperture 645, and acts as an RF conductor. At its upper end, center tube 650 flares outwardly at 660 for connection to an adapter or antenna, as described previously. At its lower end, tube 650 includes projecting tabs 655–658. Tab 655 is bent at 653, for connection to the internal circuitry of radio 5, such as printed circuit board 107 of FIGS. 6 and 9, for example. Projecting tabs 656–658 are positioned around aperture 645 to better secure tube 650 to connector 625 and for ease of assembly.

Antenna connector 625 is secured to chassis 100 by mounting nut 610, preferably in a manner similar to that shown with respect to spanner nut 110 in FIGS. 6 and 9. Extendable antennas, fixed antennas, SMA adapters such as adapters 200, 300, and other such devices can be selectively attached to connector 625, as described previously.

Antenna connector 625 according to one embodiment of the invention preferably has an impedance of approximately 50 ohms, a frequency range of approximately 0–1 GHz, a maximum working voltage of approximately 335 vrms at sea level, a dielectric withstanding voltage of approximately 1000 vrms at sea level, and a minimum insulation resistance of approximately 5000 megohms. Center contact resistance preferably is initially approximately 3.0 milliohms maximum, after an environmental 4.0 milliohm maximum. Corona level preferably is approximately 250 volts minimum at 70,000 feet, and RF high potential withstanding voltage preferably is 670 vrms minimum at 4 and 7 MHz.

Figure 13:
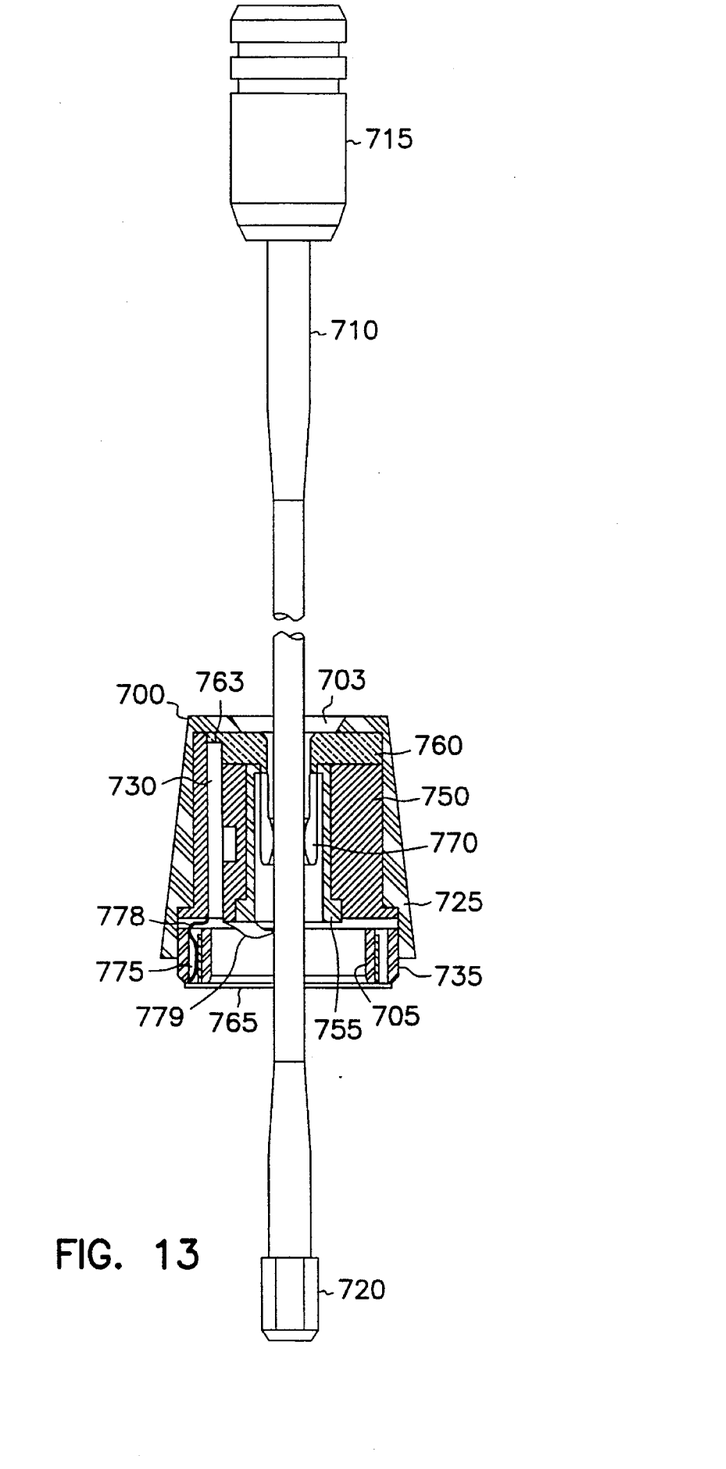
FIG. 13 is a cross-sectional view of an extendable antenna and matching circuit according to an embodiment of the invention.

FIG. 13 illustrates another extendable antenna assembly that can be used according to the invention. Tapered housing 700 of the assembly includes threaded internal surface 705 for attachment to external threads of an antenna connector, such as connector 625. Housing 700 includes outer body 725 and inner body 735, which are separated by a potting material such as epoxy or a similar material. Inner body 725 preferably is formed of a 30% glass-fill polyester material, or similar insulative material, as is connector 625. Spacer 755 is disposed radially inwardly from inner and outer bodies 735, 725, toward antenna 710, and can be formed of ABS plastic, 30% glass-fill polyester material, or similar insulative material.

Housing 700 also contains spring bushing 760, preferably formed of beryl copper or a similar material, which includes center shaft 770 and which connects mast 710 to printed circuit board 730. PCB 730 matches the impedance of antenna connector 625, preferably approximately 50 ohms, to the impedance of extendable antenna 710, typically 600 ohms. Details of the matching circuit of PCB 730 will be described with reference to FIGS. 14–15, below. PCB 730 is connected by ground contact 778 through slot 775 of inner body 735 to ground ring 765, which preferably is formed of brass and which provides grounding contact to mounting nut 610 of antenna connector 625, for example. Spring contact 779 is connected to PCB 730 and extends toward antenna 710 for conductive contact with flange 660, when the antenna is screwed onto antenna connector 625.

Housing 700 includes a central aperture 703, which allows mast 710 to be extended and retracted therethrough. Antenna mast 710 includes coil housing 715, and further includes hexagonal stop 720, which prevents removal of antenna mast 710 from housing 700.

To assemble the extendable antenna assembly of FIG. 13, spacer 755 is pressed onto center shaft 770 of spring bushing 760. PCB 730 then is pressed into slot 763 in spring bushing 760, and spring bushing 760 and inner body 735 are inserted into outer body 725 such that ground contact 778 of PCB 730 extends into through slot 775 of inner body 735. Potting material 750 then is inserted to secure inner and outer bodies 735, 725 and spring bushing 760 with respect to each other. Then, ground ring 765 is pressed into four slots in inner body 735, and antenna mast 710 is inserted through spring bushing 760. Bottom stop 720 then is crimped onto the end of antenna mast 710, using a hex crimp, such that the stop is even with the bottom of antenna mast 710. The apparatus then is to be tested for continuity, as is known in the art. Of course, alternate methods of assembling the assembly of FIG. 13 would be contemplated by those of ordinary skill.

Figure 14:
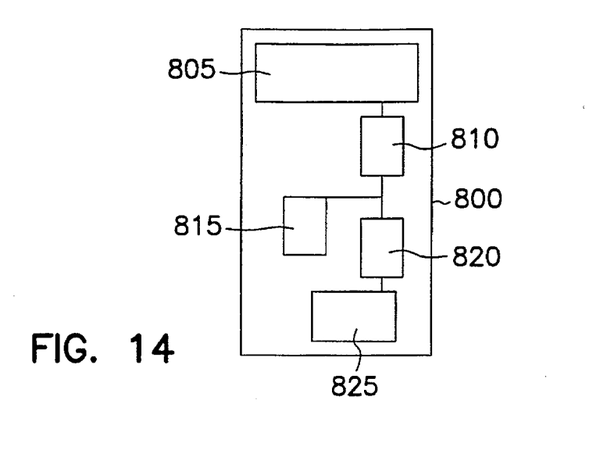
FIG. 14 is a plan view of a printed circuit board according to an embodiment of the invention.
Figure 15:
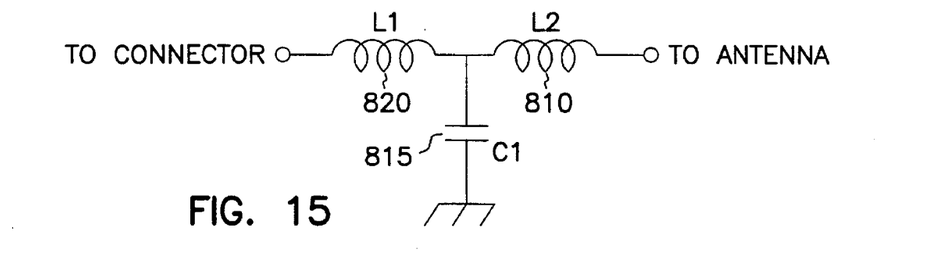
FIG. 15 is a circuit diagram of the FIG. 14 printed circuit board.
Figure 16:
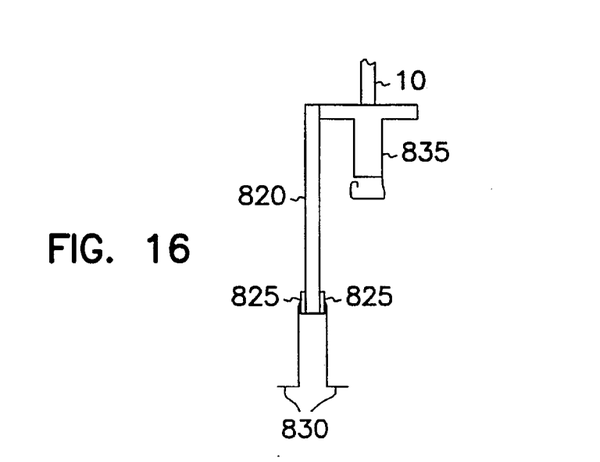
FIG. 16 shows a mounting arrangement of the FIG. 14 printed circuit board.

FIGS. 14–15 illustrate one type of matching printed circuit board usable at 730 in FIG. 13 or at 530 in FIG. 9, for example. Matching PCB 800 includes two inductors 810, 820, having preferred inductances of 27 nH and 22 nH, respectively. Capacitor 815 has a preferred capacitance of 1.6 pf. PCB 800 preferably includes contact pad 805, for connection to mast 10 by direct contact with connecting element 835, as shown in FIGS. 14 and 16. Of course, PCB 800 also can be connected to mast 10 by a wire or other conductive arrangement, with or without contact plate 805. Twin contact pads 825, disposed on opposite sides of PCB 800, preferably directly engage spring metal contacts 830 (like 779 in FIG. 13 and 532 in FIG. 9) for connection to the antenna connector, according to this embodiment.

Figure 18:
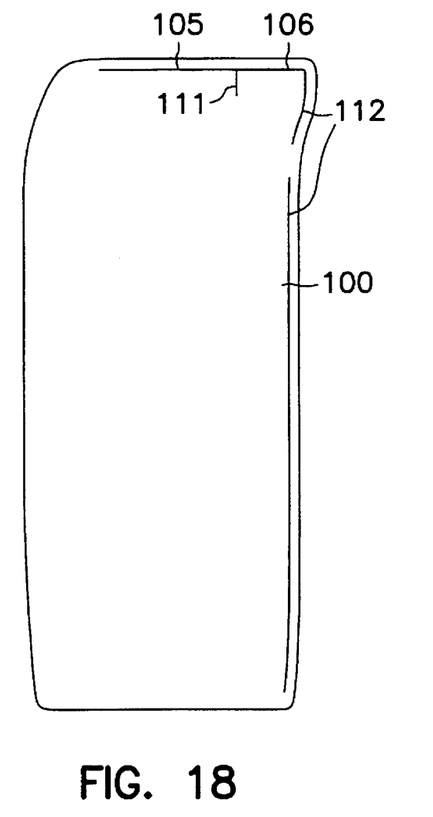
FIG. 18 is a side view of the FIG. 17 chassis.
Figure 19:
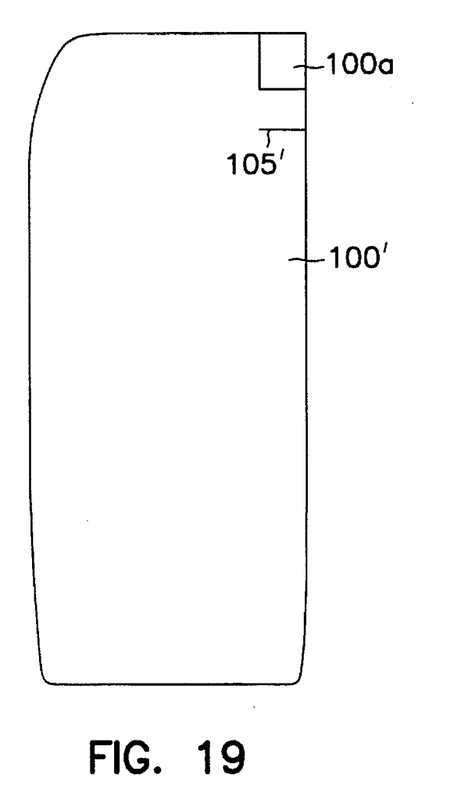
FIG. 19 is a side view of a chassis according to an embodiment of the invention.

As described earlier, FIGS. 17–18 illustrate a preferred form of metal chassis 100 and flange 105 for securing an antenna connector according to embodiments of the invention. FIG. 19 shows an alternative embodiment, in which support flange 105' of chassis 100' is completely within the radio, instead of at the uppermost portion of the housing of the radio. Consequently, the antenna connector supported by flange 105', as well as the matching circuit housing (e.g. 500 in FIG. 9 or 700 in FIG. 13), also are disposed completely within the device. According to this embodiment, metallic chassis 100' preferably includes a plastic corner portion 100a, to allow antenna 10 to transmit even while withdrawn within the radio housing, and to reduce stray capacitance between the antenna and the chassis. Alternatively, the entire chassis can be formed of plastic.

Figure 20:
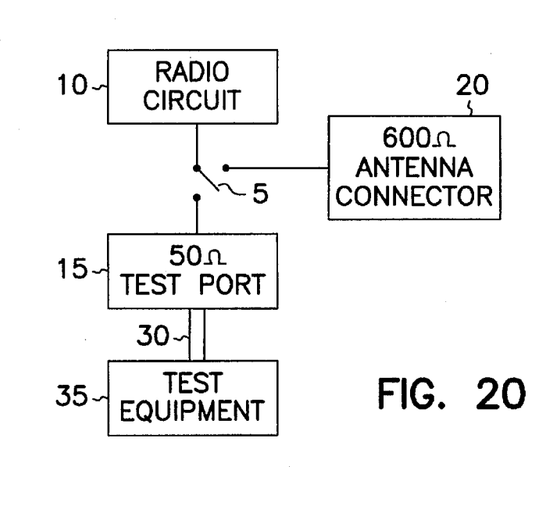
FIG. 20 is a schematic diagram of a dual-port radio.

As described earlier, an antenna connection assembly according to embodiments of the invention allows both an extendable antenna, having relatively high impedance, and external test equipment, having relatively low impedance, to be connected to a single port. An antenna connector according to the invention, for example, has a nominal RF impedance of approximately 50 ohms, and can be connected to 50 ohm test equipment and to a 600 ohm extendable antenna. The antenna connector thus serves as a single external connector port for selectively providing electrical connection to an extendable antenna and to external test equipment, so as to preclude the need for separate test and extendable antenna ports. Separate ports are shown in FIG. 20, in which switch 5 alternately connects radio circuit 10 to 50 ohm test port 15 or to 600 ohm antenna connector 20. Test port 15 receives cable 30, which is connected to test equipment 35, and antenna connector 20 receives an extendable antenna. Connecting test equipment 35 to radio circuit 10 disconnects antenna connector 20, and connecting antenna connector 20 disconnects test port 15. By eliminating the need for an arrangement like that shown in FIG. 20, embodiments of the present invention avoid the mechanical wear, complexity, cost and other problems typically associated with such arrangements.

Embodiments of the invention also are advantageous because they allow a dispatch or other type radio having a substantial metallic ground plate to accommodate a 600 ohm extendable antenna, without the detuning and stray capacitance problems prevalent in the prior art. Additionally, because an antenna connector according to embodiments of the invention can connect either an extendable or a fixed antenna to the remainder of the radio, a universal housing can be used for both dispatch radios and cellular radiotelephones, significantly reducing design and manufacturing costs.

While the invention has been described with reference to specific embodiments, the description is illustrative and is not to be construed as limiting the scope of the invention. For example, the chassis can be formed entirely of plastic. Further, a metallic ground can extend around the outside of the antenna connector, up through the chassis, for connection to the antenna. In that case, the metal ground would include a threaded portion for connection to the antenna, and would be connected to the radio ground, such as the chassis or a PC board within the radio. Various other modifications and changes may occur to those skilled in the art without departing from the spirit and scope of the invention.

What is claimed is:

1. A dispatch radio for providing radio communication to a central control station, the dispatch radio comprising:

a metallic chassis, the chassis forming a ground plane of the dispatch radio;

an antenna connector supported by the chassis, the antenna connector having an impedance of less than 200 ohms;

an extendable antenna supported by the antenna connector and electrically connected to the antenna connector, the extendable antenna being movable back and forth between an position extended from the chassis and a position retracted relative to the chassis; and a matching circuit electrically connected between the extendable antenna and the antenna connector, the matching circuit substantially matching the impedance of the extendable antenna with the impedance of the antenna connector.

2. The dispatch radio of claim 1, wherein the antenna connector has an impedance of approximately 50 ohms.

3. The dispatch radio of claim 1, wherein the dispatch radio has telephone-interconnect capability.

4. The dispatch radio of claim 1, wherein the matching circuit is housed in a housing having an aperture extending therethrough, the extendable antenna being movable between the extended position and the retracted position within the aperture.

5. The dispatch radio of claim 4, further comprising a housing of the dispatch radio enclosing at least a portion of the metallic chassis, the matching circuit being positioned completely within the housing.

6. The dispatch radio of claim 4, further comprising a housing of the dispatch radio enclosing at least a portion of the metallic chassis, the matching circuit housing extending beyond the housing and being threadably mounted on the antenna connector.

7. The dispatch radio of claim 1, wherein the antenna connector is adapted to receive an SMA adaptor.

8. The dispatch radio of claim 1, wherein the antenna connector comprises a body having an aperture extending therethrough, the extendable antenna being movable with respect to the chassis between the extended position and the retracted position within the aperture.

9. The dispatch radio of claim 8, wherein the body of the antenna connector is formed of plastic.

10. The dispatch radio of claim 8, wherein the antenna connector comprises a metallic tube within the aperture extending through the antenna connector, the metallic tube being an RF signal conductor and having a flared upper end to connect the antenna connector to the matching circuit.

11. The dispatch radio of claim 8, wherein the antenna connector further comprises a metallic contact coupled with the chassis to ground the antenna connector.

12. A radiotelephone, comprising:

a chassis;

single external connector port means supported by the chassis for selectively providing electrical connection to an extendable antenna and to external test equipment so as to preclude the need for separate test and extendable antenna ports, the single external connector port means including a central aperture, the extendable antenna passing through the aperture;

means for connecting the single external connector port means to an extendable antenna, the extendable antenna being movable back and forth between a position extended from the chassis and a retracted position relative to the chassis, the means for connecting the single external connector port means to the extendable antenna comprising matching circuit means for substantially matching the impedance of the single external connector port means with the impedance of the extendable antenna; and means for connecting the single external connector port means to radiotelephone test equipment having an impedance of less than 200 ohms.

13. The radiotelephone of claim 12, wherein the means for connecting the single external connector port means to an extendable antenna surrounds at least a portion of the extendable antenna.

14. The radiotelephone of claim 12, wherein the means for connecting the single external connector port means to radiotelephone test equipment comprises an SMA adaptor.

15. The radiotelephone of claim 12, further comprising means for connecting the single external connector port means to a fixed antenna.

16. The radiotelephone of claim 15, wherein the means for connecting the single external connector port means to a fixed antenna comprises an SMA adaptor.

17. The radiotelephone of claim 12, wherein the chassis is metallic to form a ground plane of the radio.

18. A radiotelephone, comprising:

a chassis;

an antenna connector supported by the chassis, the antenna connector having an impedance of less than 200 ohms, the antenna connector receiving an extendable antenna that is movable back and forth between a position extended from the chassis and a position retracted relative to the chassis, the antenna connector alternatively receiving a fixed antenna that is fixed in a position external to the chassis; and a matching circuit coupled with the extendable antenna to substantially match the impedance of the antenna connector with the impedance of the extendable antenna.

19. The radiotelephone of claim 18, wherein the metallic chassis comprises an antenna connector support flange, the antenna connector extending through the antenna connector support flange, at least a portion of the antenna connector being external to chassis.

20. A method of using a radiotelephone to preclude the need for separate test and extendable antenna ports, the method including:

supporting a single external connector port by a chassis of the radiotelephone;

selectively connecting an extendable antenna to the single external connector port and extending the extendable antenna through an aperture in the single external connector port;

selectively disconnecting the extendable antenna from the single external connector port; and selectively connecting external test equipment to the single external connector port, the external test equipment having an impedance of less than 200 ohms.

* * * * *